United States Patent [19]
Danek

[11] Patent Number: 4,958,655
[45] Date of Patent: Sep. 25, 1990

[54] MULTIPLE FILL LEVEL VEHICLE FUEL SYSTEM

[75] Inventor: Michael J. Danek, Laingsburg, Mich.

[73] Assignee: General Motors Corporation, Detroit, Mich.

[21] Appl. No.: 482,133

[22] Filed: Feb. 20, 1990

[51] Int. Cl.⁵ ............................................. F16K 24/04
[52] U.S. Cl. ...................................... 137/80; 137/202; 137/587; 137/599; 123/516
[58] Field of Search ................... 137/79, 80, 587, 588, 137/202, 599; 123/516

[56] References Cited

U.S. PATENT DOCUMENTS

| | | | |
|---|---|---|---|
| 2,336,730 | 12/1943 | Hayter | 137/80 |
| 2,416,514 | 2/1947 | Chadwick | 137/80 X |
| 2,883,112 | 4/1959 | Stoltman | 137/79 X |
| 2,917,110 | 12/1959 | Brohl | 137/79 |
| 4,142,677 | 3/1979 | Ludwig | 137/468 X |
| 4,779,637 | 10/1988 | Ubaldi | 137/588 X |
| 4,893,643 | 1/1990 | Gifford | 137/202 |
| 4,896,690 | 1/1990 | Taylor | 137/80 X |

Primary Examiner—Stephen M. Hepperle
Attorney, Agent, or Firm—Patrick M. Griffin

[57] ABSTRACT

A two fill level system uses a valve within the tank interior having a pair of different height venting inlets to the vent pipe, with a fuel level responsive seal at one inlet and a temperature responsive seal at the other inlet.

3 Claims, 2 Drawing Sheets

MULTIPLE FILL LEVEL VEHICLE FUEL SYSTEM

This invention relates to vehicle fuel systems in general, and specifically to such a system with a liquid fuel tank that has two different fill levels, dependent upon temperature.

BACKGROUND OF THE INVENTION

Conventional vehicle fuel systems have a liquid fuel tank with a single fill level. A filler pipe is adapted to receive a pump fuel nozzle, and feeds fuel into the tank interior. The air and fuel vapor mixture displaced by the entering liquid fuel must be allowed to exit the tank freely in order to prevent a pressure build up that would otherwise block the liquid fuel from entering. Free venting is typically provided by a vent pipe, the inlet of which rests at a predetermined level or height within the tank interior, and the outlet of which vents either directly to atmosphere, or, in proposed new designs, to a vapor storage canister. The height of the vent pipe inlet within the tank determines the tank fill level. When liquid fuel reaches and blocks the vent pipe inlet, pressure in the tank builds up, sending liquid fuel up the filler pipe and automatically shutting off the fuel nozzle.

The empty volume remaining between the surface of the liquid fuel and the top of the tank at the end of fill is needed in order to accommodate the fuel vapor that will inevitably form, and which would otherwise raise the pressure within the tank. Since more fuel will vaporize in hot than in cold weather, the residual volume must be made large enough to accommodate the hot weather condition. This means that the tank cannot be filled as high in colder weather as it otherwise could be. Tailoring fill level to the temperature would give more efficient utilization of the available tank volume.

SUMMARY OF THE INVENTION

The invention provides a fuel tank for a vehicle fuel system in which the fuel fill level is higher at lower temperature, and lower at higher temperatures.

In the preferred embodiment disclosed, a vehicle fuel system includes a fuel tank of conventional size and shape, with a filler pipe and a vent pipe. The inner end of the vent pipe is located in the tank interior, while the other end of the vent pipe opens into the filler pipe. A valve has a valve body mounted to the inner end of the vent pipe with a pair of inlets opening to the vent pipe, a first inlet at a lower level and a second at a higher level. A seal responsive to the fuel level, which is a float in the embodiment disclosed, closes off the first inlet when the fuel level has risen to the lower level. Whether this will in turn stop the fill process depends on whether the second, higher inlet is open or closed. If open, fill can continue to the second, higher level. If closed, fill stops at the lower level.

The second inlet is opened or closed by a temperature responsive seal that is open unless the interior tank temperature is above a predetermined threshold. In the embodiment disclosed, the temperature responsive seal is a bimetal leaf with a seal plug that rests above the second inlet. The temperature threshold would be chosen to reflect the winter-summer differential expected to be seen by the vehicle. In warmer weather, the leaf and seal plug are down, blocking the higher venting inlet, and fill stops at the lower level. In colder weather, the leaf and seal plug are up, and fill can proceed to the higher level.

It is, therefore, a general object of the invention to make more efficient use of the available volume in a vehicle fuel tank.

It is another object of the invention to make more efficient use of the fuel tank by providing a valve that gives two different fill levels, dependent upon a cold-warm temperature threshold.

It is another object of the invention to provide two different fill levels through the use of a valve that has lower and higher inlets to a tank vent pipe, the lower of which is always closed off when the fuel level reaches it, and the higher of which is closed off only when the tank temperature is above a predetermined threshold, thus allowing higher fill levels in colder weather.

DESCRIPTION OF THE PREFERRED EMBODIMENT

These and other objects and features of the invention will appear from the following written description, and from the drawings, in which.

Figure 1:
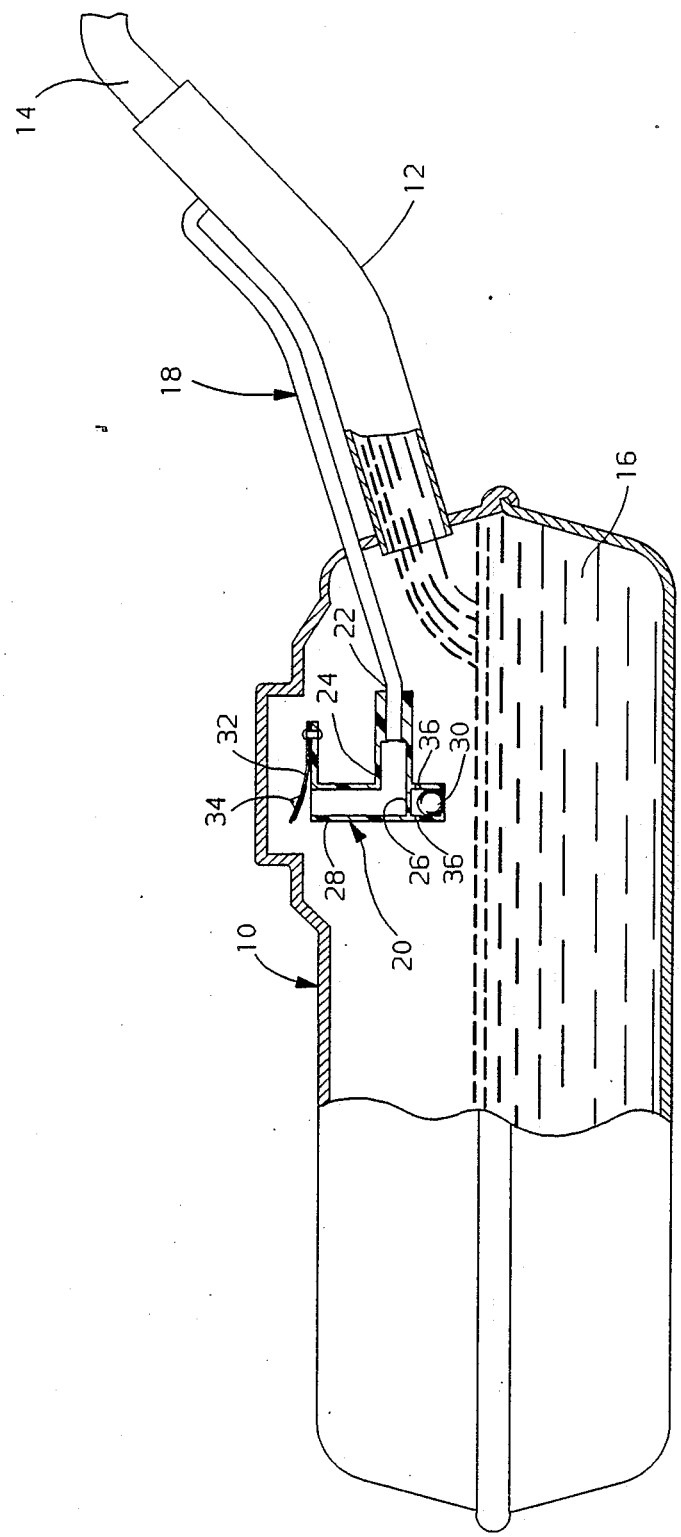
FIG. 1 is a view of a fuel tank incorporating the two level fill system of the invention, with part of the tank broken away to reveal interior detail.

Referring first to FIG. 1, a fuel tank incorporating the invention is indicated generally at 10. Fuel tank 10 has a conventional filler pipe 12 that receives a filler nozzle 14. Nozzle 14 pumps liquid fuel 16 into tank 10, which rises and displaces air from tank 10 through a vent pipe, designated generally at 18. Nozzle 14 shuts off automatically when fuel 16 backs up far enough to reach nozzle 14. That happens only when air can no longer escape through vent pipe 18, thereby pressurizing the interior of tank 10 sufficiently to force fuel 16 to back up. The invention provides a temperature responsive valve, designated generally at 20, which gives two different, temperature dependent fuel fill levels.

Figure 2:
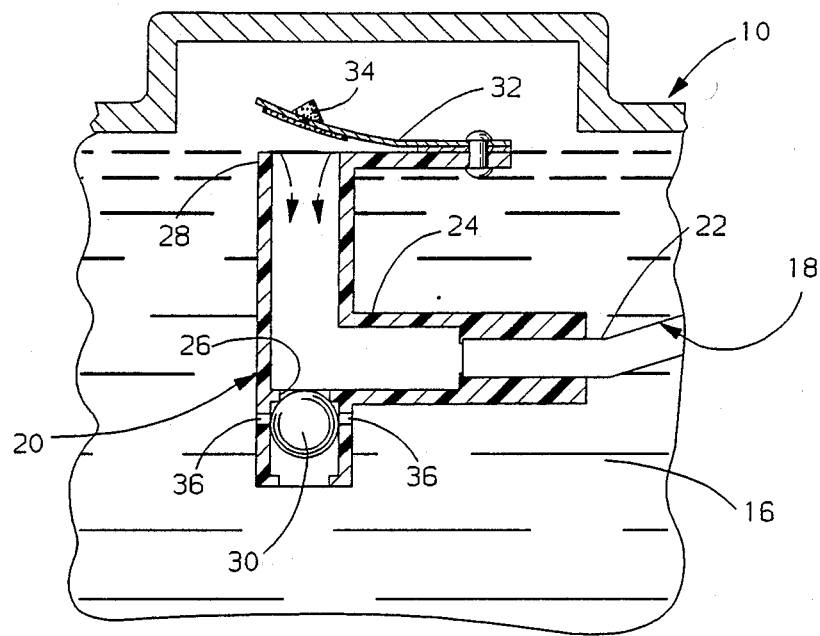
FIG. 2 is an enlarged view of part of the tank interior, showing the valve body in cross section and the upper inlet open, giving the higher, cold weather fill level.

Referring next to FIG. 2, vent pipe 18 has an inner end 22 that rests in the interior space of tank 10 and which, in a conventional tank, would represent the only final fill level available. Fuel 16 would rise to vent pipe end 22, blocking it off and preventing any further venting. In the invention, valve 20 comprises a T-shaped plastic housing 24, with the middle of the T plugged over the vent pipe end 22 and the arms of the T arranged generally vertically. Thus, the arms of the T provide two different inlets to vent pipe end 22, a lower inlet 26 and a higher or upper inlet 28. A buoyant ball float 30 is captured to housing 24 below lower inlet 26, so as to rise and shut off lower inlet 26 when fuel 16 has risen to that lower level. Riveted to housing 24 above upper inlet 28 is a leaf 32 of bimetal material with a seal plug 34 at the end. A series of small vent holes 36 through housing 24 provide clear venting access to lower inlet 26, and are designed to have a total area at least equal to that of vent pipe end 22, for a purpose described below.

Referring still to FIG. 2, leaf 32 is open, that is, in the up position shown only if the temperature is below a predetermined threshold. Stated conversely, it is down only if the temperature is above that threshold. The threshold would be chosen to be the temperature above which significantly greater vaporization of the fuel 16 could be expected, which could be around 80 degrees F.

Below the temperature threshold, as fuel rises toward lower inlet 26, air can freely vent from tank 10 through both inlets 26 and 28. As the fuel 16 rises high enough to close off lower inlet 26 with float 30, upper inlet 28 is still open, and venting is still possible. Fuel 16 can continue to rise, and does so, until it reaches the higher level of upper inlet 28, at which point it begins to pour into housing 24, as illustrated. This immediately restricts or blocks free venting, causing a quick back up in filler pipe 12. While some fuel 16 would pour into vent pipe 18, it is likely that nozzle 14 would be shut off before vent pipe 18 would be filled to any great extent. The higher level that fuel 16 can reach below the temperature threshold still leaves enough expansion space. As fuel 16 is drawn out and burned, and the level falls again below the height of lower inlet 26, any fuel 16 that is in vent pipe 18 drains out, escaping through vent holes 36 to the extent that it does not leak past float 30.

Figure 3:
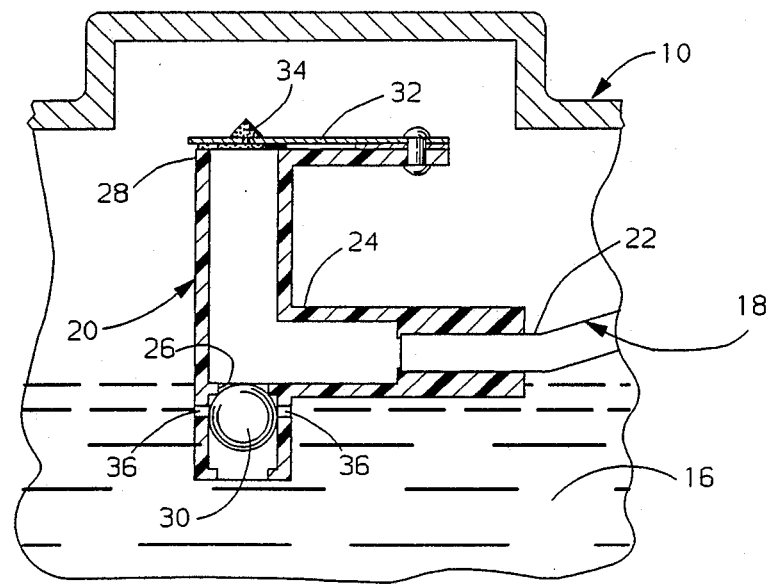
FIG. 3 is a view like FIG. 2, but showing the upper inlet closed, giving the lower, warm weather fill level.

Referring next to FIG. 3, at temperatures above the threshold, leaf 32 will be in the down position shown, closing upper inlet 28 with seal plug 34. The upper layer of leaf 32 would be the layer with the higher thermal expansion rate, causing it to flex down. As fuel 16 rises during fill, venting of tank 10 can occur only through vent holes 36 and lower inlet 26, not through upper inlet 32. The area of vent holes 36 noted above assures that there will be no venting restriction. Now, however, when fuel 16 rises high enough to close lower inlet 26 with float 30, there is no alternate vent, and fuel 16 will rise in filler pipe 12 to shut off nozzle 14. The vapor space left above fuel 16 will be large enough to accommodate warm weather vaporization. Thus, the two level design allows for more efficient utilization of the total volume of tank 10.

Variations of the preferred embodiment disclosed could be made. Most broadly, the temperature responsive seal and fuel level responsive seal could be reversed. That is, a bimetal that was closed when cold, but open when hot, could be placed below the lower vent inlet, and a float arranged to close off the upper inlet. Then, in the cold condition, fuel would rise until it raised the float to close off the higher inlet, and in the hot condition, rising fuel would close off the open, lower vent when it had risen only that high. In other words, the use of venting inlets at two different levels within the tank, with a fuel level responsive seal at one inlet and a temperature threshold responsive seal at the other inlet is what yields the two different fill levels. Some other fuel level responsive seal could be used other than a ball float, such as a buoyant flapper door. Some other temperature responsive seal could be used, such as a thermocouple switch and solenoid. Therefore, it will be understood that it is not intended to limit the invention to just the embodiment disclosed.

The embodiments of the invention in which an exclusive property or privilege is claimed are defined as follows:

1. In a vehicle fuel tank of the type having a vent pipe for venting said tank as it is filled, a temperature responsive valve for providing two different fuel fill levels in said tank, said valve comprising, a pair of inlets opening to said vent pipe at different levels within said tank, a fuel level responsive seal for closing off one of said inlets when fuel reaches the level of said first inlet, and, a temperature responsive seal for closing off the other of said inlets when the temperature in said tank is beyond a predetermined threshold, whereby, the fuel level may be selectively switched from the level of one of said inlets to the other by allowing tank venting to occur until fuel reaches the level of one inlet or the other depending on whether the tank temperature is beyond said threshold.

2. In a vehicle fuel tank of the type having a vent pipe for venting said tank as it is filled, a temperature responsive valve for providing two different fuel fill levels in said tank, said valve comprising, a first inlet opening to said vent pipe at a lower level within said tank and a second inlet opening to said vent pipe at a higher level within said tank, a fuel level responsive seal for closing off said first inlet when fuel reaches said lower level, and, a temperature responsive seal for closing off said second inlet only when the interior tank temperature is above a predetermined threshold, whereby, when the interior tank temperature is below said threshold, said tank can still vent through said second inlet even after said fuel level responsive seal is closed and until fuel reaches said higher level, and when the interior tank temperature is above said threshold and said second inlet is closed by said temperature responsive seal, said tank can vent only through said first inlet and only until fuel reaches said lower level and closes said fuel level responsive seal.

3. In a vehicle fuel tank of the type having a vent pipe for venting said tank as it is filled, a temperature responsive valve for providing two different fuel fill levels in said tank, said valve comprising, a valve body having a first inlet opening to said vent pipe at a lower level within said tank and a second inlet opening to said vent pipe at a higher level within said tank, a buoyant seal located below said first inlet so as to close off said first inlet when fuel reaches said lower level, and, a seal plug mounted on a bimetal leaf above said second inlet so as to close off said second inlet only when the interior tank temperature is above a predetermined threshold, whereby, when the interior tank temperature is below said threshold, said tank can still vent through said second inlet even after said buoyant seal has closed off said first inlet and until fuel reaches said higher level, and when the interior tank temperature is above said threshold and said second inlet is closed by said plug, said tank can vent only through said first inlet and only until fuel reaches said buoyant seal at said lower level and closes said first inlet.

* * * * *